(12) United States Patent
Tcarevskii et al.

(10) Patent No.: US 12,237,987 B1
(45) Date of Patent: Feb. 25, 2025

(54) ACTIVE NETWORK MONITORING

(71) Applicant: Amazon Technologies, Inc., Seattle, WA (US)

(72) Inventors: Andrei Tcarevskii, Dublin (IE); Ezequiel Lara Gomez, Dublin (IE); Damien Desmarets, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 197 days.

(21) Appl. No.: 17/546,969

(22) Filed: Dec. 9, 2021

(51) Int. Cl.
*H04L 43/10* (2022.01)
*H04L 43/0811* (2022.01)
*H04L 45/745* (2022.01)

(52) U.S. Cl.
CPC .......... *H04L 43/10* (2013.01); *H04L 43/0811* (2013.01); *H04L 45/745* (2013.01)

(58) Field of Classification Search
CPC ..... H04L 43/10; H04L 43/0811; H04L 45/745
See application file for complete search history.

(56) References Cited

U.S. PATENT DOCUMENTS

| | | | | |
|---|---|---|---|---|
| 7,673,048 | B1 * | 3/2010 | O'Toole, Jr. | H04L 12/4633 709/227 |
| 2005/0243733 | A1 * | 11/2005 | Crawford | H04L 45/36 370/252 |
| 2006/0227714 | A1 * | 10/2006 | Griffin | H04L 43/50 370/241 |
| 2013/0058235 | A1 * | 3/2013 | Johnsson | H04L 43/0876 370/252 |
| 2013/0332602 | A1 * | 12/2013 | Nakil | H04L 43/04 709/224 |
| 2014/0068054 | A1 * | 3/2014 | Pollnow | H04L 43/10 709/224 |
| 2015/0124629 | A1 * | 5/2015 | Pani | H04L 41/0836 370/248 |
| 2015/0244617 | A1 * | 8/2015 | Nakil | H04L 41/0897 709/224 |
| 2016/0112481 | A1 * | 4/2016 | Pani | H04L 65/611 370/390 |
| 2016/0366019 | A1 * | 12/2016 | Pani | H04L 63/20 |
| 2018/0337839 | A1 * | 11/2018 | Bristow | H04L 12/4633 |
| 2020/0145313 | A1 * | 5/2020 | Raindel | H04L 41/0677 |
| 2020/0382399 | A1 * | 12/2020 | Tewari | H04L 41/40 |
| 2021/0160173 | A1 * | 5/2021 | Biradar | H04L 43/0841 |
| 2021/0352000 | A1 * | 11/2021 | Devaraj | H04L 45/70 |
| 2022/0224780 | A1 * | 7/2022 | Chhabra | H04L 41/0894 |

* cited by examiner

*Primary Examiner* — Christopher M Crutchfield
*Assistant Examiner* — Tito Q Pham
(74) *Attorney, Agent, or Firm* — Klarquist Sparkman, LLP

(57) ABSTRACT

In networks, some communication links may be provided as part of a network underlay to reach outer networks/regions. Technologies are disclosed for monitoring/analyzing targeted networks using probe packets sent from outside of the targeted networks. The probe packets are configured to include an outer IP packet encapsulating an inner UDP packet, where the inner UDP packet indicates a source of the probe (e.g., an agent) as both the source and destination address. Time to Live (TTL) values for the inner and outer packets are controlled to propagate the packet through the network using the underlay to access the outer network/regions.

20 Claims, 8 Drawing Sheets

ACTIVE NETWORK MONITORING

BACKGROUND

Large computer networks, such as those used in cloud computing, may contain hundreds or thousands of components of several types, such as switches, routers, and hubs, which are interconnected with links. Generally, network routers receive packets on input ports and transmit the received packets to output ports based on a configuration of the network router. A forwarding table controls which next hops receive the packets. Typically, the forwarding table is programmed in accordance with routing strategies, such as equal-cost multi-path (ECMP) routing, which is a strategy where next-hop packet forwarding to a destination can occur over multiple best paths.

Network characteristics, such as latency and packet loss are important metrics for testing of a network. Network operations and engineering teams use latency and packet loss determinations to identify and fix network performance problems. The latency experienced between a network source and a network destination is determined by the sum of link propagation latencies for the links on the network path between them, and the sum of the switching and queuing latencies at each router hop that interconnects those links. Packet loss occurs when a packet transmitted from a source host server computer does not reached a destination computer. Packet loss can occur for multiple reasons, such as dropped packets due to an overloaded buffer on a network switch. Latency and packet loss metrics are also affected by network devices and/or links experiencing connectivity issues (e.g., down links/devices). Both latency issues and packet loss can be identified and monitored using agents that transmit and receive test probes across the network.

DETAILED DESCRIPTION

Monitoring network metrics, such as packet loss and latency (e.g., round trip delay) helps to ensure continuous operation of the network according to expected performance characteristics by identifying and fixing network problems as they arise. One mechanism for monitoring network metrics includes sending probe packets from an agent through the network and analyzing payloads of such probe packets upon return to a monitoring service. However, in the case of network regions in which agents or corresponding servers are not represented/located, performing such probe operations typically involves installing and connecting new equipment (e.g., monitoring devices, such as agents) to provide an agent presence in the region. Depending on a size of the network, such an endeavor may call for the deployment of a large number of such monitoring devices, increasing cost and complexity of the monitoring service.

In some approaches, active network monitoring may be based on a tracerouting mechanism, which sends User Datagram Protocol (UDP) packets with different Time to Live (TTL) designations to understand which hops are traversed when navigating the network. The disclosure provides technologies that allow agents to use underlay devices and/or links to send probe packets through networks/network regions that do not include agents. For example, IP-in-IP probes (e.g., probe packets) may be sent from an agent to devices in a network fabric. The agent may be configured to encapsulate at least one inner UDP packet within an outer Internet Protocol (IP) packet, where the UDP packet specifies the IP address of the agent (e.g., the server hosting the agent) as both the source and destination address. The probe packet may be subsequently decapsulated by a device in the network fabric specified as the destination of the outer IP packet, and the inner UDP packet may be routed back to the agent. The Time to Live (TTL) specified for the inner and outer IP packets may be controlled by the agent to perform tracerouting, as described in more detail below. For example, the TTL of the outer packet may be incremented until an Internet Control Message Protocol (ICMP) expire message (e.g., a time exceeded in transit message) is received, at which point the TTL of the outer packet is frozen and the TTL of the inner packet is incremented. The agent and/or another computing system in communication with the agent, may utilize the received probe packets to determine and/or monitor network characteristics, including packet loss and latency, topology, link/device status, etc. The above and other features of the disclosed mechanisms for monitoring network performance in networks are described in more detail below with respect to the corresponding figures.

Figure 1:
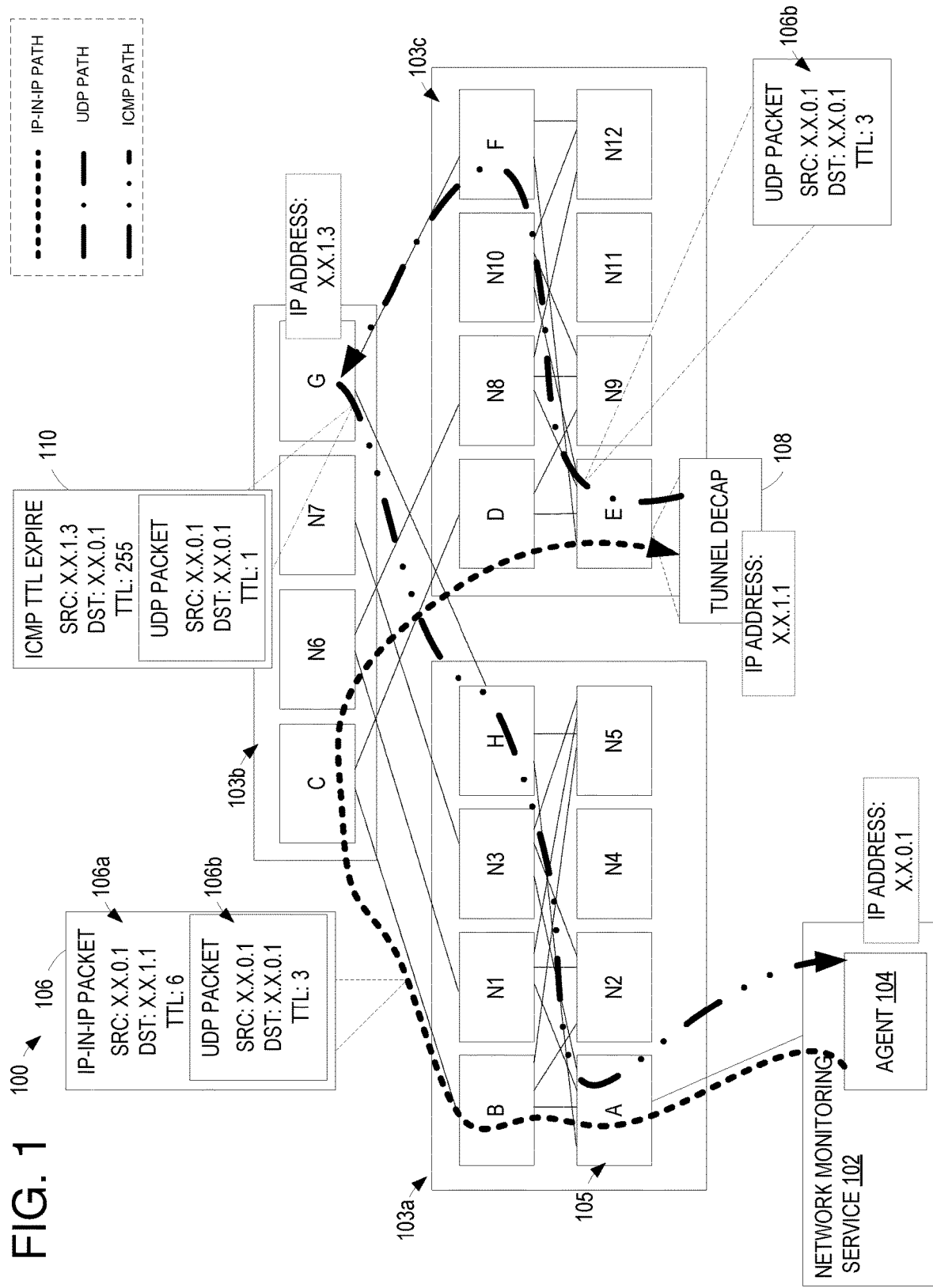
FIG. 1 is a block diagram of an example system for sending probes from an agent located outside a targeted network region to determine communication paths and measure metrics of the targeted network region.

FIG. 1 shows an example system 100 for monitoring network performance and configuration using external probe devices. For example, a network monitoring service 102 may include a computing system configured to manage the sending and processing of probe packets through one or more networks/network fabrics (e.g., networks 103a-103c) using an agent 104. The networks 103a-103c may include any suitable network type(s) or configuration(s), such as an IP network, a multiprotocol label switching (MPLS) network, overlay network, underlay network, border network, backbone network, etc. For example, the network monitoring service 102 may be included in and/or directly connected to the network 103a, and may be connected to network 103c via IP-in-IP tunnels.

In order to initiate the sending of a probe packet, the network monitoring service 102 may determine targeted ingress/egress devices (e.g., routers or switches in a point of presence [POP] or other type of network location, such as network devices 105, including devices A-G and N1-N12, which communicate via networks) and generate payload and/or header information corresponding to the devices through which the probe packet is to traverse. For example, the network monitoring service 102 may generate an IP-in-IP packet 106, which includes an outer IP packet 106a and at least one inner UDP packet 106b. The headers of the outer IP packet 106a may indicate an address of the agent (e.g., X.X.0.1 in the illustrated example) as the source address and an address of a targeted network device (e.g., X.X.1.1, corresponding to network device E in the illustrated example) as the destination address. The headers of the inner UDP packet 106b may indicate the address of the agent (e.g., the same address) for both the source and destination address, in order to control the targeted network device to send the UDP packet back to the agent once the IP-in-IP packet is decapsulated by tunnel decapsulation component 108. It is to be understood that in some examples, each network device in network 103c may have a tunnel decapsulation component, which may be configured to decapsulate the packet and extract the inner UDP packet only if the tunnel decapsulation component is for the network device that corresponds to the destination specified in the outer IP packet header.

The IP-in-IP packet 106 also includes TTL fields for the outer IP packet 106a and the inner UDP packet 106b. The TTL fields may be set by the agent 104 to progressively trace routes through the networks 103a-103c. For example, the agent 104 may initially set each TTL field to 1 for each of the inner and outer IP packets. When a first network device 105 on the IP-in-IP path (e.g., network device A) receives the IP-in-IP packet, the network device decrements the TTL. When the TTL reaches zero, an ICMP expire message is returned to the agent. The agent may resend the IP-in-IP packet 106 with an incremented TTL for the outer IP packet each time an ICMP expire message is received. Once the IP-in-IP packet reaches the destination network device E, the tunnel decapsulation component 108 decapsulates the IP-in-IP packet, thereby removing the outer IP packet. As the inner UDP packet has a TTL set to 1, the network device E may decrement this value to zero, and send a corresponding ICMP expire message. The agent may determine that the received ICMP expire message indicates expiry of the TTL of the UDP packet rather than the outer IP packet and/or that the expire message indicates the destination as the source of the message, thereby indicating that the packet has reached the destination. In other examples, the network device E may return the UDP packet to the agent (e.g., instead of the expiry message), and the agent may determine that the packet has reached the destination based on the receipt of the UDP packet. If further tracerouting is to be performed for the network that includes the network device E (e.g., network 103c), the agent may perform such tracerouting by freezing the outer IP packet TTL to the last set value and incrementing the TTL of the inner UDP packet. For example, when the network device E decapsulates the UDP packet, if the UDP packet has a TTL greater than 1 (e.g., a TTL of 3 in the illustrated example), the network device E may route the packet back through the network 103c toward the agent, and each network device that receives the UDP packet may decrement the TTL value until such decrementing results in the TTL reaching a value of zero (e.g., at network device G in the illustrated example), at which point the network device (e.g., network device G in the illustrated example) sends an ICMP TTL expire message corresponding to the UDP packet. The agent may send IP-in-IP packets with updated UDP TTLs in this manner (e.g., incrementing the TTL of only the inner UDP packet each time an ICMP expire message is received) until a desired end point is reached or until the inner UDP packet is returned, at which point the agent may log the returned messages and determine corresponding network characteristics based on the returned messages, as described in more detail below.

For example, the returned probe packet may include timestamps from one or more devices that received the packet along its path through the networks 103a-103c. Such timestamps may include a timestamp indicating a time of receipt by each network device that received that packet or the final network device that received the packet (e.g., the network device that decapsulated the packet). The timestamps may enable the network monitoring service to determine network metrics, such as latency, in the networks by determining and/or comparing round trip delay/travel time measurements for one or more paths through the networks based on the timestamps. For example, a difference between two timestamps in the return probe packet may indicate a travel time for the packet to traverse a corresponding path between the two devices that provided the timestamps. Comparisons of such travel time between the two devices over time (e.g., based on multiple probe packets sent through the networks) may be used to determine trends in network conditions (e.g., to identify when the time is increasing, indicating increased latency, etc.). The network metrics and/or information/instructions based thereon may be output to a user interface (e.g., a graphical user interface of a client device) and/or to another device for controlling operations of the network based on the determined metrics.

While the illustrative examples described above relate to an IP-in-IP packet including a single outer IP packet and a single inner UDP packet, it is to be understood that the described technologies may similarly be applied for IP-in-IP packets having multiple inner packets. For example, an outer IP packet may include one or more inner IP packets, where an inner most IP packet includes a further inner UDP packet. The outer IP packet TTLs and the inner UDP packet TTL may be incremented as described above, where the outer IP packet TTL is frozen once an indication of expiry of the first inner IP packet is received, at which point the first inner IP packet TTL is incremented until an indication of expiry of its encapsulated inner packet (whether IP or UDP), and so on until an innermost UDP packet TTL expiry is received and/or a targeted destination is reached. In additional or alternative examples, it is also understood that the description herein relating to inner UDP packets may also be applied to any type of IP packet, for examples in which another type of IP packet is encapsulated in an outer IP packet.

Figure 2:
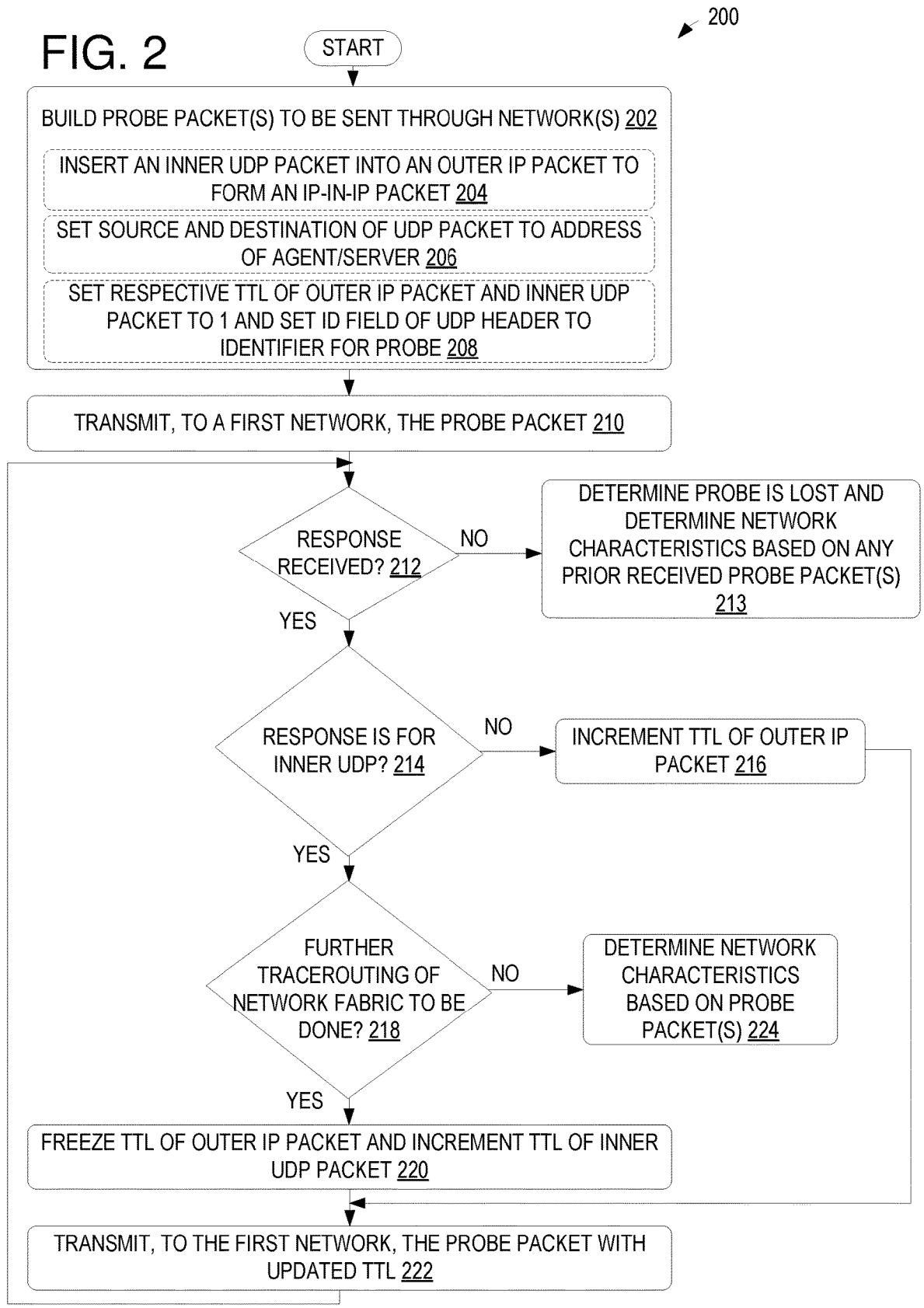
FIG. 2 is a flow chart of an example method of routing probe packets having outer IP-in-IP packets and inner UDP packets by controlling Time to Live (TTL) incrementation for the packets.

FIG. 2 is an example method 200 for building probe packets and performing network monitoring based on the probe packets. Method 200 may be performed by one or more processors of a network monitoring service, such as network monitoring service 102 of FIG. 1. At 202, the method includes building one or more probe packets to be sent through one or more networks. As indicated at 204, building the packet(s) may include inserting (or encapsulating) an inner UDP into an outer IP packet to form an IP-in-IP packet. As indicated at 206, building the packet(s) may further include setting the source and destination of the UDP packet to the address of the agent and/or server that is building/sending the packet. It is to be understood that the outer IP packet may have a source address that is defined as the address of the agent/server and a destination address that is defined as the address of a targeted network device.

As indicated at 208, building the packet(s) further includes setting a respective TTL field of the outer and inner packets to 1 (or to a designated starting value) and setting an ID field of a header of the inner UDP packet to an identifier indicating that the packet is a probe packet. As will be described in more detail below, the TTL setting described at 208 refers to an initial value for a first transmission of a probe packet, and the TTL fields may be adjusted for subsequent transmissions.

At 210, the method includes transmitting, to a first network, the probe packet built at 202. For example, the probe packet may be sent to a first hop along a path to the target destination. At 212, the method includes determining if a response to the probe packet is received. If a response is not received (e.g., "NO" at 212), the method may include determining that the probe packet is lost or dropped, as indicated at 213. For example, if a response to the probe packet is not received within a threshold period of time after transmission (e.g., based on an expected travel time for the packet), the agent may infer that a link across which the probe packet is transmitted or a network device may be down or experiencing packet loss. Accordingly, the issue may be logged and further network characteristics may be determined based on any packets that were received during the probe period (e.g., any prior-transmitted probe packets sent according to method 200).

If a response is received (e.g., "YES" at 212), the method proceeds to 214 to determine a type of response that is received. For example, as described above, a network device that receives a packet may decrement the TTL field and, upon determining that such operation resulted in a TTL of 0 (e.g., a TTL expiry), generate and return an ICMP TTL expire message, similar to message 110 of FIG. 1, to the source of the packet (e.g., the agent). In another example, a network device with a tunnel decapsulating component may decapsulate the packet and return the inner UDP packet to the agent.

At 214, the method includes determining if the response relates to an inner UDP packet (e.g., if the response includes the inner UDP returned from a targeted network device and/or the response indicates a TTL expiry of the inner UDP packet instead of an expiry of the outer IP packet). For example, the agent may determine whether the response includes only header information from the UDP packet and not from the outer IP packet. If the response is not for the inner UDP (e.g., "NO" at 214), the agent may determine that the packet has not yet reached the target destination and/or exited the IP tunnel, and thus the TTL may be advanced in order to control the packet to traverse one further hop toward the destination. Accordingly, at 216, the method includes incrementing the TTL of the outer IP packet, then proceeding to 222 to transmit the probe packet with the updated TTL. For example, the TTL for the outer IP packet may be incremented while the TTL for the inner UDP packet is maintained at the same initialized value (e.g., 1).

If the response is determined at 214 to relate to the inner UDP packet (e.g., "YES" at 214), the agent may determine that the packet has reached the target destination and/or has exited the IP tunnel and has been decapsulated by a tunnel decapsulation component of a network device. Accordingly, in response, the method may include determining if further tracerouting of the network fabric is to be performed, as indicated at 218. For example, if additional hops within the network reached via the IP tunnel are to be traversed, the agent may determine that further tracerouting is to be performed. If further tracerouting is to be performed (e.g., "YES" at 218), the method includes freezing (e.g., maintaining) the TTL of the outer IP packet at a last-used value and incrementing the TTL of the inner UDP packet, as indicated at 220. The method further includes transmitting the probe packet with the updated TTL, as indicated at 222. The method then returns to 212 to determine if a response to the updated/retransmitted probe packet is received and repeat the decision steps and corresponding operations described above at 212-222. Accordingly, the TTL field for the outer IP packet may be incremented each time a response of a TTL expiration is received, up until the response is for an expiration of the TTL of the inner UDP packet. At that point, the last-used TTL for the outer IP packet may be frozen/maintained and the TTL of the UDP packet may be incremented with each subsequent response of a TTL expiration.

Once the agent determines that further tracerouting is not to be performed (e.g., "NO" at 218; such as when a target network device is reached), the method includes determining network characteristics (e.g., routes/pathways through the network and associated transit delays along the paths) based on the probe packets, as indicated at 224. For example, a total round trip delay may be calculated from the packet (e.g., using timestamps to determine a length of time that elapsed between sending the packet via the agent and receiving the response at the agent). The determined metrics may include any suitable network/network device metrics, including latency, packet loss, and/or other metrics derived from the packet (e.g., the payload of the packet).

Figure 3:
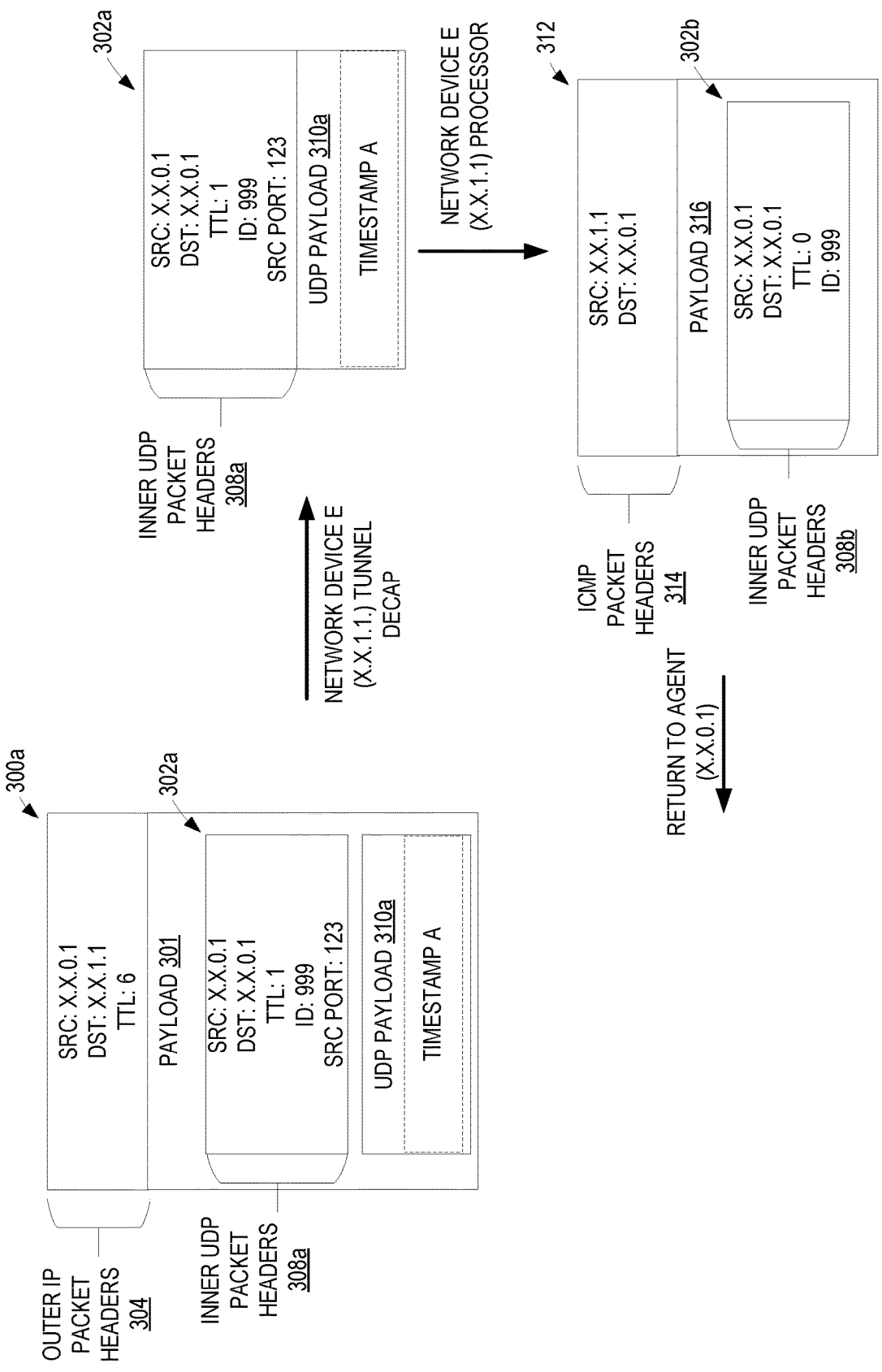
FIG. 3 shows example contents of an IP-in-IP probe packet and resulting processing of the IP-in-IP probe packet by a receiving network device.

FIG. 3 schematically shows example processing of a probe packet sent through a network in accordance with the disclosed technologies. IP-in-IP packet 300a includes a payload 301 that includes an inner UDP packet 302a. The IP-in-IP packet further includes outer IP headers 304 specifying a source address of an agent and destination address of a targeted destination network device, as well as a TTL value. The TTL value of the illustrated example may be understood to be a TTL value that is set after multiple rounds of incrementing, as the packet 300a is used to perform tracerouting as described above with respect to FIGS. 1 and 2. It is to be understood that in other examples that utilize other communication protocols, additional, fewer, and/or different combinations of headers may be used in the headers of the outer IP packet and/or the inner UDP packet.

The inner UDP packet 302a includes inner UDP headers 308, which specify the same source and destination-namely, the address of the agent sending the packet 300a, and which also includes a TTL value for the UDP packet, an identifier field, populated with a value identifying the UDP packet as a probe packet (e.g., having a unique value for that probe packet within a probing session), and a source port, populated with a value used to route the UDP packet (e.g., the source port value may be used by the receiving device, such as input to a hashing algorithm, to select one of a plurality of next hop options for routing the packet). In the illustrated example, the TTL value for the UDP packet 302a is set to 1, as it has not been received at the targeted network device yet. The UDP packet 302a may also include a payload, which may, in some examples, include a Timestamp A identifying a time at which the probe packet was transmitted, in order to assist with determining a round trip delay of the probe packet (e.g., the agent may compare a time of receipt of the UDP packet with the timestamp to determine the round trip delay). In other examples, the agent may additionally or alternative log the transmission time for the probe packet (e.g., in a database associated with the agent) for use in determining the round trip delay as described above.

The IP-in-IP packet is transmitted to the targeted network device (in the illustrated example, network device E), and is first processed by a tunnel decapsulation component of the network device to strip off the outer IP packet, resulting in the standalone inner UDP packet 302a as illustrated. This UDP packet is then processed by another processor(s) or processing component(s) of the targeted network device, which decrements the TTL by 1. As this operation results in a TTL value of 0, the UDP packet is designated as being expired, causing generation of an ICMP expire message 312. As shown the ICMP expire message 312 includes ICMP headers 314, which indicate the source as the address of the targeted network device (e.g., the device that decremented the TTL to 0) and the destination as the source of the UDP packet 302a (e.g., the agent). The ICMP message 312 also includes a payload 316, which includes at least a portion 302b of the UDP packet 302a. In the illustrated example, the UDP headers 308a (updated to indicate the TTL is now 0) are included in the payload 316. In other examples, a portion of the UDP headers 308a may be included in the payload 316. The setting of the ID field of the UDP headers to a value identifying the packet as a probe packet may help to ensure that this indicator is propagated with the ICMP expire message 312, as other information from the original UDP packet 302a may be discarded and/or otherwise not included in the ICMP expire message. The ICMP expire message 312 may be transmitted to the agent based on the source address indicated in the UDP headers 308b.

Figure 4:
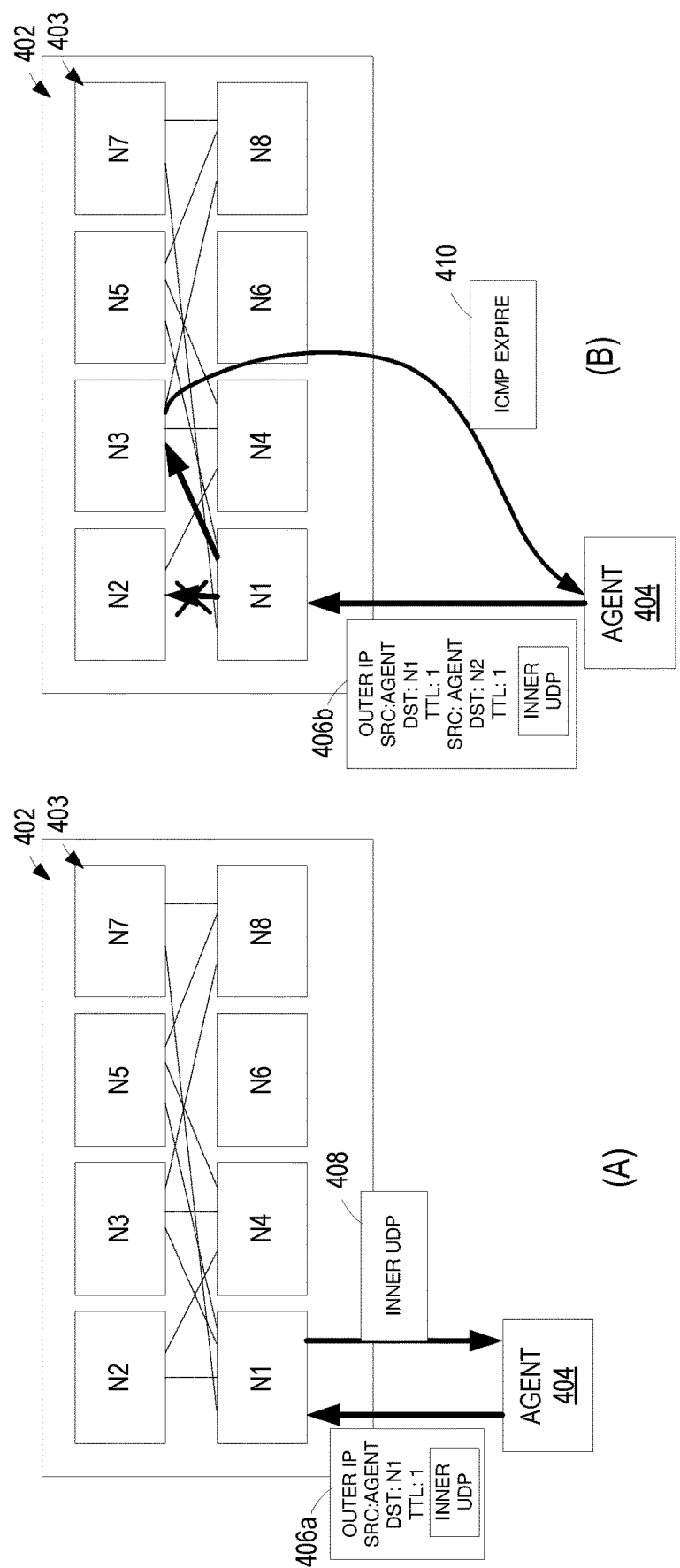
FIG. 4 is a block diagram showing an example tracerouting operation using IP-in-IP probe packets in which a destination is changed for subsequently-sent packets.

FIG. 4 shows an example approach for transmitting probe packets through a network 402 for network monitoring and/or tracerouting purposes by using a set value of TTL for an outer IP packet and updating a destination for each hop. For a first probe packet transmission, shown at "A," an agent 404 sends an IP-in-IP probe packet 406a to a first network device 403 of the network (e.g., network device N1). The headers of the outer IP packet of probe packet 406a identify the source as the agent 404 and the destination as the first hop (network device N1), as well as a TTL of 1. The IP-in-IP packet 406a may also include an inner UDP packet, configured as described above with respect to the example inner UDP packets referenced in FIGS. 1-3. In this way, under normal operating procedures, a response to the probe packet will be returned to the agent upon reaching network device N1. As described above with respect to network device E of FIG. 1, the network devices of network 402 may include tunnel decapsulation components configured to decapsulate the IP-in-IP packet 406a to extract the inner UDP packet. Accordingly, upon reaching the destination network device N1, the network device N1 decapsulates the UDP packet, and returns the inner UDP packet to the agent (e.g., as described above in earlier examples, the UDP packet may specify the address of the agent as both source and destination to ensure it is routed back to the agent).

For a second probe packet transmission, shown at "B" in FIG. 4, an IP-in-IP probe packet 406b is transmitted to the network 402. At this stage, stacked headers are used to propagate the packet to a further destination. The destination indicated in the first header of the outer IP packet is again set to N1 with a TTL of 1, while a second header of the outer IP packet identifies a next hop (e.g., network device N2), and the TTL is again set to 1. When the probe packet arrives at a first network device N1, the network device N1 recognizes that it is not the final destination (e.g., the outermost header is stripped off, revealing the next header specifying a next destination of N2), and attempts to forward it to the next destination (e.g., network device N2). However, in this example, the network device N2 is not reachable via the communication link between N1 and N2 (e.g., the communication link is down). Accordingly, the network device N1 attempts to reach N2 via an alternate route—through network device N3. However, since the TTL is set to 1, upon reaching network device N3, the TTL is decremented to 0, resulting in an expiration of the packet. In response, an ICMP expire message 410 is sent back to the agent 404 (e.g., based on the source address indicated in the inner UDP packet), which may be analyzed by the agent to triangulate the downed link. In this way, the agent 404 may determine network conditions with a high level of accuracy by increasing a hop destination for sequentially-transmitted probe packets while keeping TTL designations of the probe packets at a value of 1.

Figure 5:
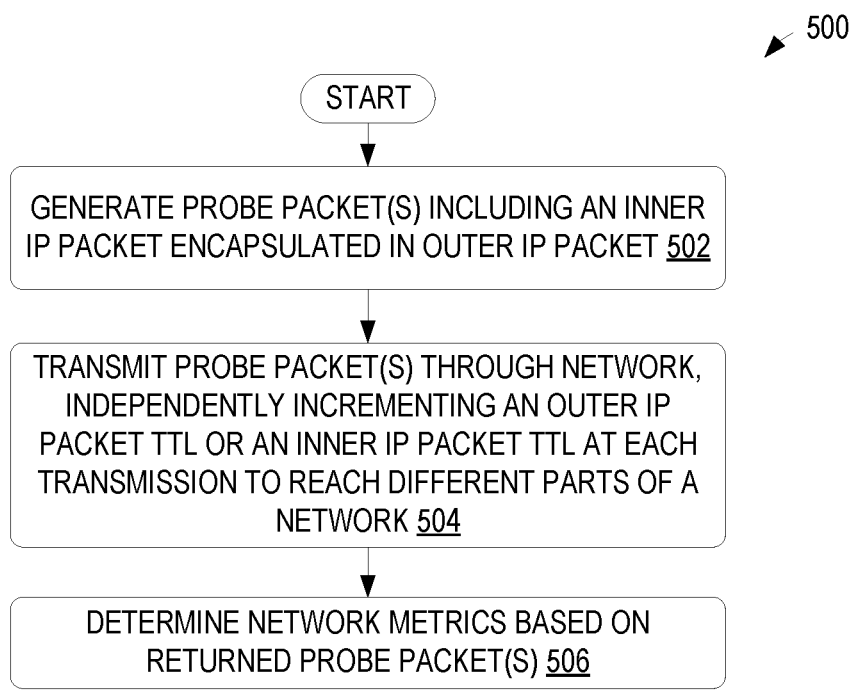
FIG. 5 is a flow chart of an example method of monitoring a network using probe packets with encapsulated UDP packets.

FIG. 5 is a flow chart of an example method 500 of monitoring a network using IP-in-IP probe packets. The method 500 may be performed by a network monitoring service (an example of which is described above with respect to network monitoring service 102 of FIG. 1) using an agent (e.g., positioned outside of a target network) to send probe packets through the target network using an underlay. At 502, the method includes generating probe packets, each including an inner IP packet (e.g., a UDP packet) encapsulated in an outer IP packet. As described above and in more detail with respect to FIG. 3, the outer IP packet may specify the agent as a source and a targeted network device in the network as a destination, while the inner IP packet may specify the agent as both the source and destination.

The method further includes transmitting the probe packets through the network (e.g., using the network underlay), where a TTL value for the outer IP packet or the inner IP packet is independently incremented at each transmission (e.g., each time the probe packet is retransmitted) to reach different parts of a network, as indicated at 504. For example, the outer IP packet TTL may be incremented until the inner IP packet is returned or a TTL expiry for the inner IP packet is received, at which point the outer IP packet TTL is frozen and the inner IP packet TTL is incremented for each subsequent transmission of the probe packet.

At 506, the method includes determining network metrics based on the returned probe packets. For example, as described above, once the probe packet has been transmitted through the network and returned to the agent, the probe packet is examined by the network monitoring service to determine metrics of the network. By examining multiple probe packets in this manner (e.g., by repeating method 500 over time for multiple probe packets), real-time and/or trending metrics such as latency/round trip delay, packet loss, etc. for the network overlay may be estimated by the network monitoring service.

Figure 6:
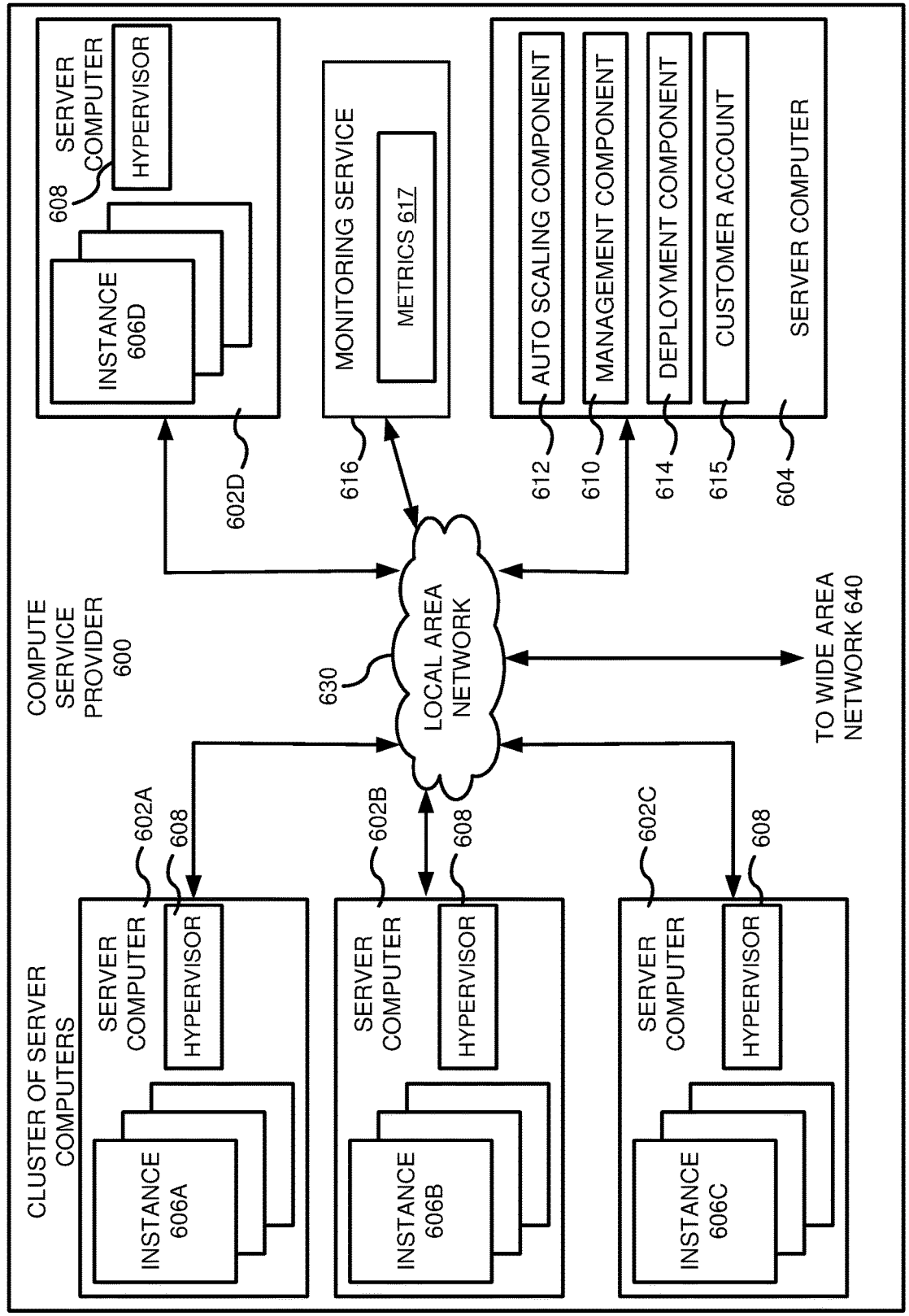
FIG. 6 is an example system diagram showing a plurality of virtual machine instances running in a multi-tenant environment.

FIG. 6 is a computing system diagram of a network-based compute service provider 600 that illustrates one environment in which embodiments described herein can be used. In some examples, one or more of the monitoring service 102 and/or the network devices 105 of FIG. 1 is used and/or included in a cloud environment such as the environment of FIG. 6. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

In some implementations of the disclosed technology, the computer service provider 500 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example of virtual machine, each of the servers 602A-602D can be configured to execute a hypervisor 608 or another type of program configured to enable the execution of multiple instances 606 on a single server. Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. In some examples, the server computer may include components for managing and/or interfacing with the network monitoring technologies described herein. In such examples, the components of the server computer may include tools that access devices in the network (e.g., the other server computers 602A-602B and/or routers or other network devices in the local area network 630 and/or wide area network 640). For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

Monitoring service 616 may include components for implementing the network monitoring technologies described herein, such as the monitoring service 102 of FIG. 1. For example, monitoring service 616 may manage the generation and processing of probe packets using computing resources distributed among the server computers 602 and/or other components in accordance with the methods and systems described herein. Monitoring service 616 may also include a metrics database 617 configured to store metrics information determined based on the responses to the probe packets and/or other metrics information for the network.

A network 630 can be utilized to interconnect the server computers 602A-602D and the server computer 604. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

Figure 7:
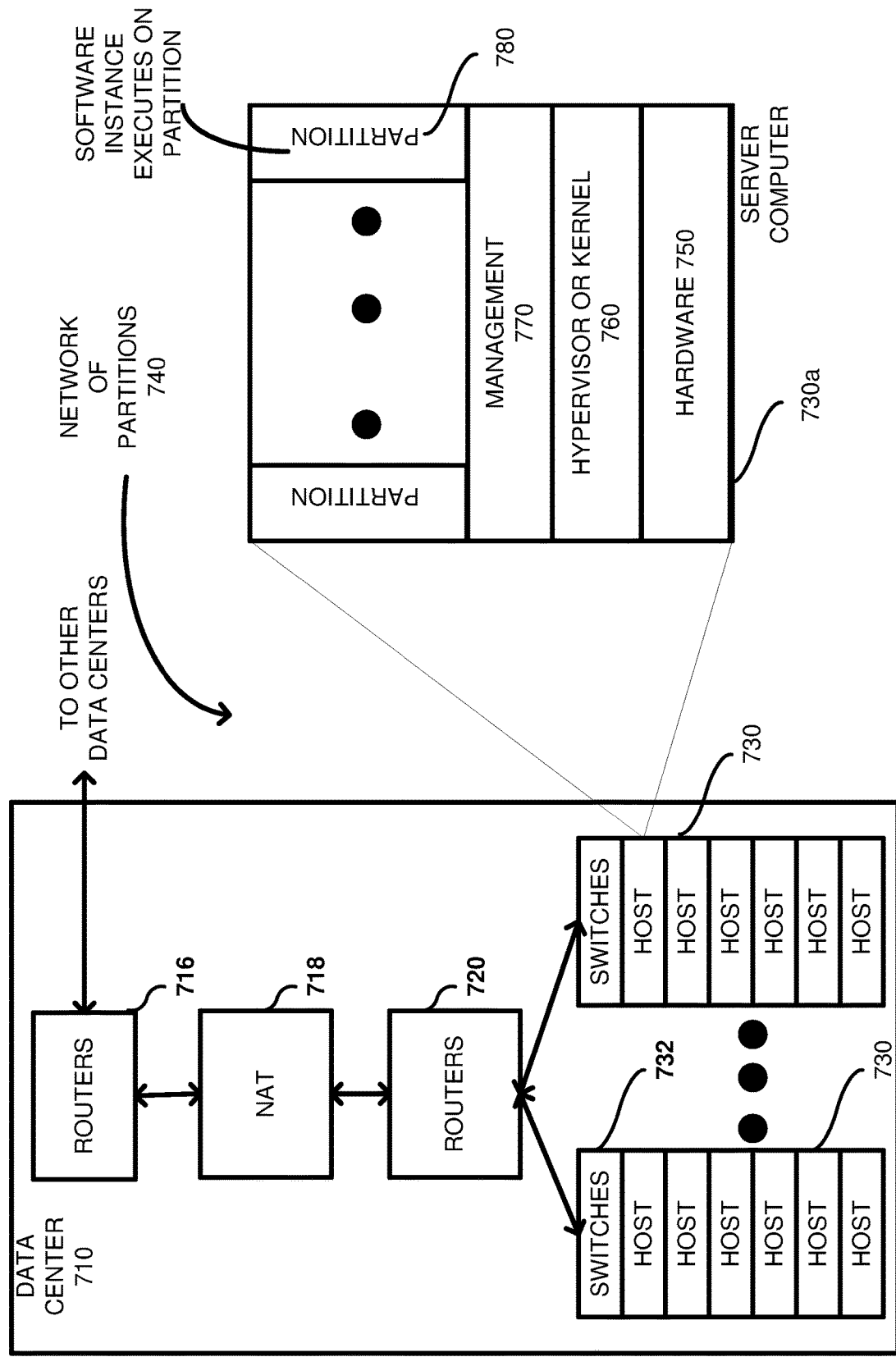
FIG. 7 shows an example of a plurality of host computers, routers and switches, which are hardware assets used for running virtual machine instances.

FIG. 7 illustrates a network of partitions 740 and the physical hardware associated therewith. The network of partitions 740 can include a plurality of data centers, such as data center 710, coupled together by routers 716. The routers 716 read address information in a received packet and determine the packet's destination, for example, based on stacked headers as described herein. If the router decides that a different data center contains a host server computer, then the packet is forwarded to that data center. If the packet is addressed to a host in the data center 710, then it is passed to a network address translator (NAT) 718 that converts the packet's public IP address to a private IP address. The NAT also translates private addresses to public addresses that are bound outside of the datacenter 710. Additional routers 720 can be coupled to the NAT to route packets to one or more racks of host server computers 730. Each rack 730 can include a switch 732 coupled to multiple host server computers. A particular host server computer is shown in an expanded view at 730a.

Each host 730 has underlying hardware 750 including one or more CPUs, memory, storage devices, etc. Running a layer above the hardware 750 is a hypervisor or kernel layer 760. The hypervisor or kernel layer can be classified as a type 1 or type 2 hypervisor. A type 1 hypervisor runs directly on the host hardware 750 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 770 can be part of the hypervisor or separated therefrom and generally includes device drivers needed for accessing the hardware 750. The partitions 780 are logical units of isolation by the hypervisor. Each partition 780 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

Any applications executing on the instances can be monitored using the management layer 770, which can then pass the metrics to a client monitoring service, such as monitoring service 616 of FIG. 6, for storage in a metrics database, such as metrics database 617 of FIG. 6. Additionally, the management layer 770 can pass to the monitoring service the number of instances that are running, when they were launched, the operating system being used, the applications being run, etc. All such metrics can be used for consumption by a health monitoring service and stored in a corresponding database.

Figure 8:
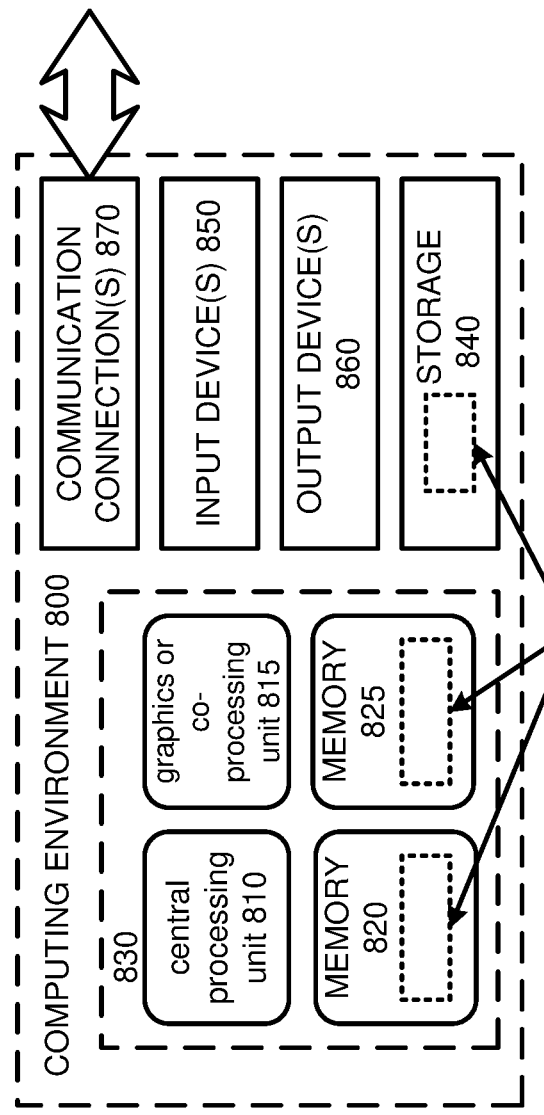
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A computer system comprising:
   memory for storing executable instructions; and
   one or more processors that execute the instructions to:
     determine packet headers for a probe packet comprising an inner User Datagram Protocol (UDP) packet encapsulated within an outer IP packet, wherein packet headers for the outer IP packet include a source identifying an address of an agent sending the probe packet, a destination identifying an address of a target network device in a network to be monitored, and a Time to Live (TTL) field having an initialized value of 1, and wherein the packet headers for the inner UDP packet include a source and destination each identifying the address of the agent, a TTL field having an initialized value of 1, and an identifier field having a value identifying the inner UDP packet as a probe;
     repeatedly transmit, to the network, the probe packet;
     receive responses to the probe packet from network devices in the network, wherein the probe packet is retransmitted at least once by the agent with an incremented TTL value for the inner UDP packet or outer IP packet based on whether a corresponding response to a last transmission of the probe packet relates to the inner UDP packet, wherein the TTL value for the inner UDP packet or outer IP packet is incremented independently each time the probe packet is retransmitted through the network to reach different parts of the network, wherein the TTL value of the outer IP packet is incremented while maintaining the TTL value of the inner UDP packet responsive to receiving a response relating to the outer IP packet and the TTL value of the inner UDP packet is incremented while maintaining the TTL value of the outer IP packet responsive to receiving a response relating to the inner UDP packet;
     determine network metrics for the network based on a payload of the received responses; and
     output an indication of the determined network metrics.

2. The computer system of claim 1, wherein determining the network metrics includes determining latency or packet loss in the network overlay based on timestamps included in the payload of the received responses.

3. The computer system of claim 1, wherein retransmitting the probe packet with the incremented TTL value comprises incrementing the TTL value of the outer IP packet responsive to receiving an Internet Control Message Protocol (ICMP) message indicating a TTL expiry of the outer IP packet.

4. The computer system of claim 1, wherein retransmitting the probe packet with the incremented TTL value comprises freezing the TTL value of the outer IP packet and incrementing the TTL value of the inner UDP packet responsive to receiving an Internet Control Message Protocol (ICMP) message indicating a TTL expiry of the inner UDP packet.

5. The computer system of claim 1, wherein the agent is located outside of the network and in communication with the network via an IP-in-IP tunnel.

6. A method comprising:
   generating a probe packet having an inner Internet Protocol (IP) packet encapsulated in an outer IP packet;
   transmitting the probe packet through a network;
   retransmitting the probe packet through the network, wherein a Time to Live (TTL) field of a header of the outer IP packet or a TTL field of a header of the inner IP packet is incremented independently each time the probe packet is retransmitted through the network to reach different parts of the network, the TTL field of the header of the outer IP packet being incremented while maintaining the TTL field of the header of the inner IP packet responsive to receiving a response relating to the outer IP packet and the TTL field of the header of the inner IP packet being incremented while maintaining the TTL field of the header of the outer IP packet responsive to receiving a response relating to the inner IP packet; and
   determining and reporting network metrics based on returned messages corresponding to transmissions of the probe packet through the network.

7. The method of claim 6, wherein the probe packet is generated and transmitted by an agent, and wherein a header of the inner IP packet indicates an address of the agent as both a source address and a destination address.

8. The method of claim 7, wherein the header of the outer IP packet indicates the address of the agent as a source address and an address of a targeted network device in the network as a destination address.

9. The method of claim 8, wherein the agent is communicatively connected to the targeted network device via an IP-in-IP tunnel of an underlay of the network.

10. The method of claim 8, wherein the targeted network device includes a tunnel decapsulation component configured to decapsulate the probe packet and return the inner IP packet to the agent.

11. The method of claim 6, wherein the inner IP packet is a UDP packet, wherein a header of the inner UDP packet includes an identifier field, and wherein generating the probe packet includes inputting a value of the identifier field in the inner UDP packet that identifies the probe packet as a probe.

12. The method of claim 6, wherein the probe packet is retransmitted through the network with the incremented TTL field in the outer IP packet responsive to receiving an Internet Control Message Protocol (ICMP) response indicating expiration of the TTL of the outer IP packet, and wherein the TTL field of the header of the outer IP packet is incremented until the inner IP packet or a return message corresponding to a TTL expiration of the inner IP packet is received at an agent specified as the source and destination of the inner IP packet.

13. The method of claim 12, wherein, responsive to receiving the inner IP packet or the return message indicating the TTL expiration of the inner IP packet at the agent, freezing the TTL field in the IP packet at a last-used value, incrementing the TTL field in the header of the inner IP packet, and retransmitting the probe packet through the network with the incremented TTL field of the inner IP packet.

14. The method of claim 6, wherein determining the network metrics includes determining latency or packet loss in the network overlay.

15. The method of claim 14, wherein the latency or packet loss is determined based on one or more timestamps included in a payload of the probe packet.

16. The method of claim 6, wherein determining the network metrics includes determining communication links that are out of service based on the paths of the probe packet.

17. One or more non-transitory computer-readable media comprising computer-executable instructions that, when executed, cause a computing system to perform a method comprising:

generating a probe packet having an inner User Datagram Protocol (UDP) packet encapsulated in an outer Internet Protocol (IP) packet, wherein the inner and outer packets include respective Time to Live (TTL) fields set to a value of 1, wherein both a source field and a destination field of a header of the UDP packet are set to an address of an agent that generates the probe packet, and wherein a destination field of a first header of the IP packet is set to an address of a first network device corresponding to a first hop in a communication path to a targeted network device in a network;

transmitting the probe packet through the network;

responsive to receiving the decapsulated UDP packet back at the agent, iteratively updating the outer IP packet to include additional stacked headers, each additional header having a respective destination field identifying a next hop in the communication path, and retransmitting the probe packet with the updated outer IP packet until the target network device is reached; and determining and outputting network metrics based on responses to the probe packet.

18. The one or more non-transitory computer-readable storage media according to claim 17, wherein determining network metrics includes determining and triangulating a non-operating communication link responsive to receiving an Internet Control Message Protocol (ICMP) expiry message in response to transmission of the probe packet.

19. The one or more non-transitory computer-readable storage media according to claim 18, wherein the non-operating communication link is determined to be a direct communication link between a last-used destination and a currently-used destination for the header of the IP packet.

20. The one or more non-transitory computer-readable storage media according to claim 17, wherein the UDP packet includes an identifier field having a value assigned thereto that identifies the UDP packet as a probe.

* * * * *